July 11, 1939.  E. A. WALES  2,165,670
CLUTCH
Filed March 27, 1937  3 Sheets-Sheet 1
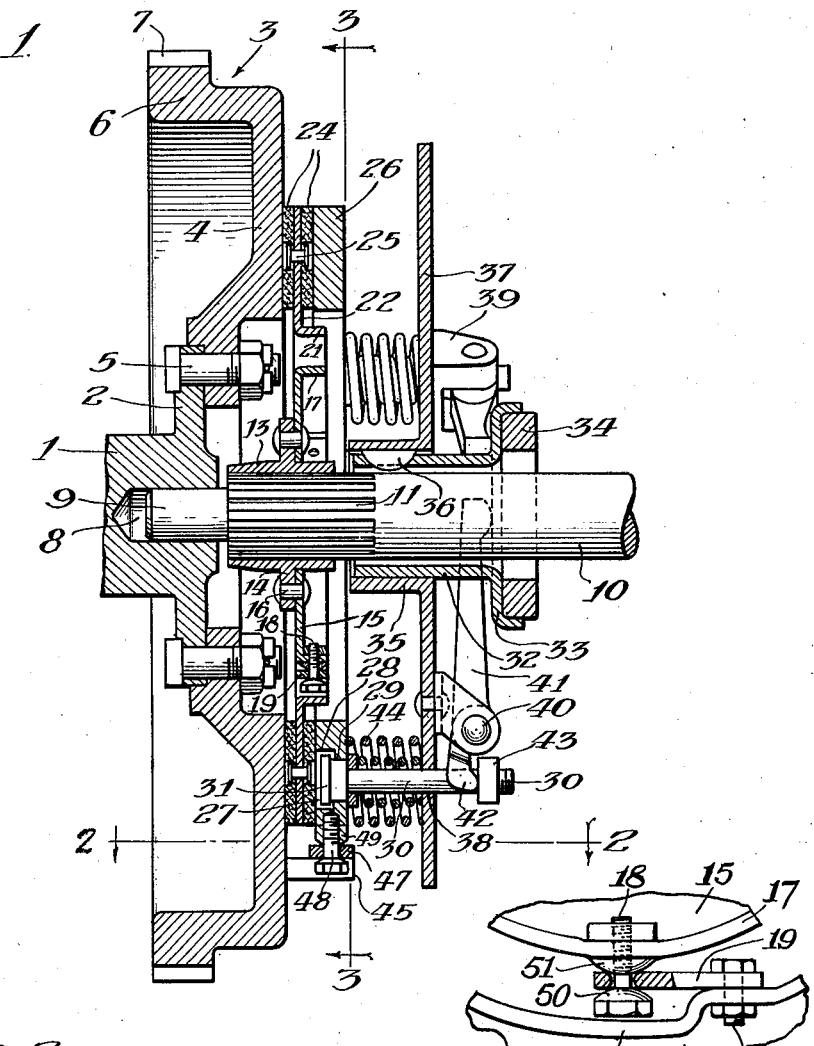
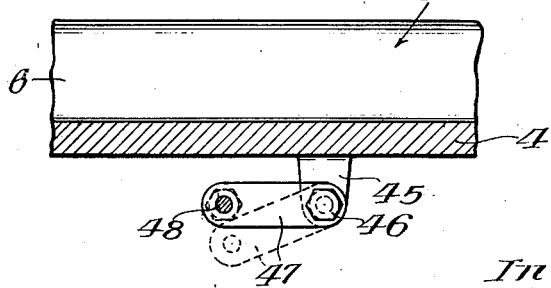
Inventor:
Earl A. Wales
By: Lee J. Gary
Attorney July 11, 1939.  E. A. WALES  2,165,670

CLUTCH

Filed March 27, 1937  3 Sheets-Sheet 2

Inventor:
Earl A. Wales,
By: Lee J. Gary
Attorney.

July 11, 1939.　　　E. A. WALES　　　2,165,670
CLUTCH
Filed March 27, 1937　　　3 Sheets-Sheet 3
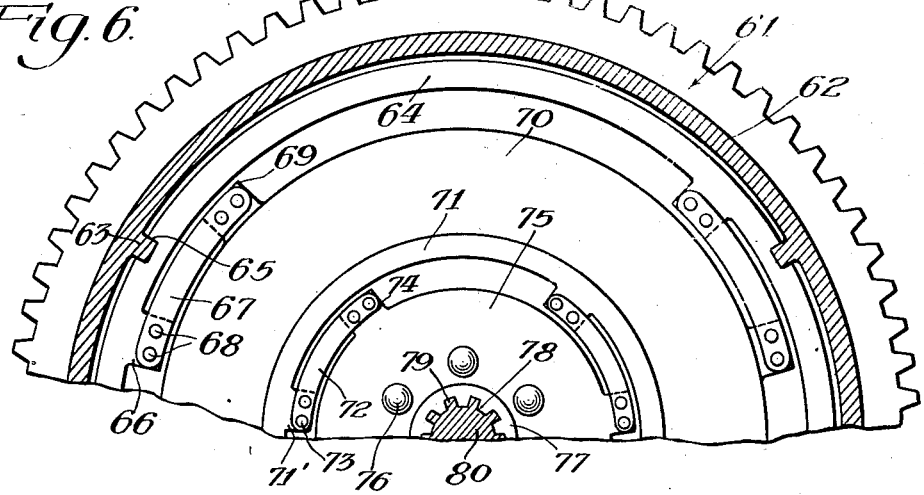
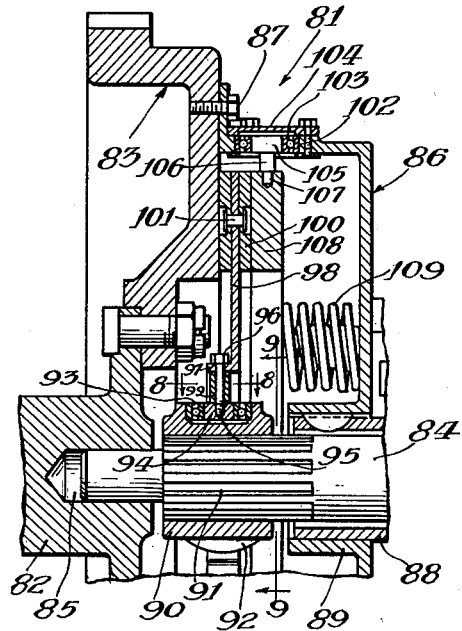
Inventor:
Earl A. Wales,
By: Lee J. Gary
Attorney.

Patented July 11, 1939

2,165,670

UNITED STATES PATENT OFFICE 2,165,670

CLUTCH

Earl A. Wales, Cleveland, Ohio, assignor to Raybestos-Manhattan, Inc., Bridgeport, Conn., a corporation of New Jersey Application March 27, 1937, Serial No. 133,331

9 Claims. (Cl. 192—68)

This invention relates to improvements in clutches, particularly clutches employed in automotive vehicles or the like, and refers specifically to a clutch construction wherein means is provided which facilitates the ready release of the friction element or driven member from the driving member.

In the usual automotive clutch, a driving member, usually the fly-wheel of the engine, a friction facing carried by the clutch disc, (the driven member), and a pressure plate for confining the friction facing in contact with the flywheel, are provided. The clutch disc is disposed between the fly-wheel and the pressure plate, and is usually carried by a hub or collar which is splined to the clutch shaft. In the manipulation of the clutch, the splined collar, carrying the clutch disc, is moved lengthwise along the clutch shaft when the pressure plate moves the facing into contact with the fly-wheel. To release the clutch, the pressure plate is relieved of the spring pressure which urges it into contact with the facing, and in theory, the friction facing being relieved of the pressure, disengages from the fly-wheel, the disengaging movement being accomplished by the sliding of the splined hub upon the splined clutch shaft.

However, when high torque is being delivered, release of the pressure upon the pressure plate does not always result in the disengagement of the facing and fly-wheel. This is due primarily to the high normal pressure which exists between the sides of the splined teeth of the collar bearing upon the sides of the shaft splines. Under conditions of high torque delivery, this normal pressure is sometimes so great that disengagement of the facing from the fly-wheel, permitted by movement of the hub, will not take place until the delivered load is reduced regardless of the fact that the pressure plate may have previously been disengaged. Such a condition is, of course, not desirable and at times is positively dangerous since it, in effect, takes control of the vehicle out of the driver's hands.

One of the features of my invention resides in the provision of means for securing the release of the friction facing from the fly-wheel without relying on slidable movement of the splined hub of the friction disc upon the splined clutch shaft. This feature, therefore, insures full control of the motion of the vehicle irrespective of the torque being delivered at the time of exercising control.

Briefly described, my invention comprises a clutch disc, the portion of which that carries the friction facing being movable independently of the hub portion in a direction at right angles to the face of the fly-wheel. The disc is provided with means for connecting the outer portion thereof to the inner or hub portion whereby the torque may be transmitted from the outer portion to the hub and, hence, the clutch shaft.

The objects and advantages of my invention will be apparent from the accompanying drawings and following detailed description.

In the drawings, Fig. 1 is a sectional view of a clutch embodying the concept of my invention.

Fig. 2 is a detailed sectional view taken on line 2—2 of Fig. 1.

Fig. 6 is a partial face view of another modification of my invention.

Fig. 7 is a fragmentary sectional view of a further modification of my invention.

Fig. 8 is a sectional view taken on line 8—8 of Fig. 7.

Fig. 9 is a sectional view taken on line 9—9 of Fig. 7.

Fig. 10 is an enlarged view illustrating the connecting links between the inner and outer disc sections.

Figure 3:
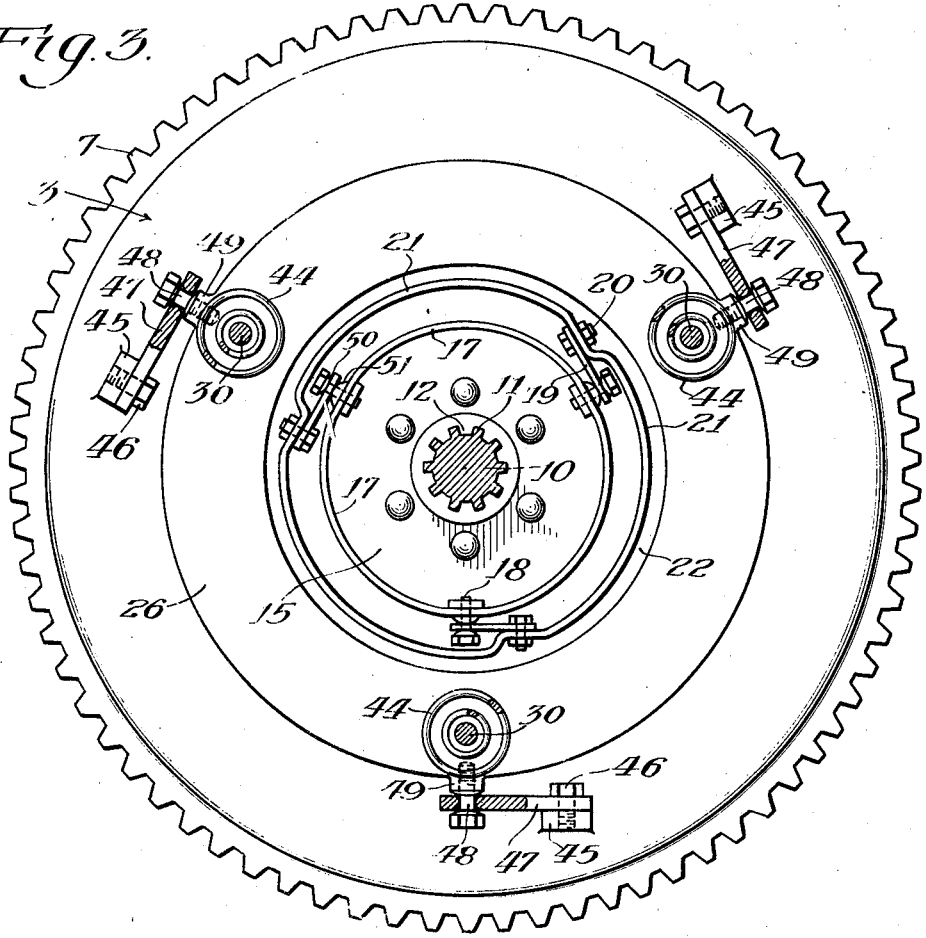
Fig. 3 is a sectional view taken on line 3—3 of Fig. 1.

Referring in detail to the drawings, I indicates the rear end of an engine shaft having an outwardly extending annular flange 2. A flywheel 3 is carried upon the shaft I, said fly-wheel having the usual annular web 4 which is secured by means of bolts or the like 5 to the flange 2. The periphery of the fly-wheel 3 may be flanged as indicated at 6, the outer surface of which is provided with gear teeth 7 which are adapted to mesh with a pinion carried by the shaft of the starting motor (not shown).

The end of the shaft I is provided with an axial bore 8 which serves as a bearing for the restricted end 9 of clutch shaft 10. The end, proper, of the clutch shaft 10 is provided with splines 11 which are adapted to intermesh with splines 12 formed on the inner surface of hub 13.

A radially extending flange 14 is formed integral with hub 13 and carries an annular disc 15, said disc being secured to the flange 14 by means of rivets 16 or other suitable fastening means. The outer periphery of the disc 15 is flanged as indicated at 17 in Figs. 1 and 3 and bolts 18 are mounted in circumferentially spaced relationship upon the flange 17. A link 19 is pivotally carried adjacent its end upon each of the bolts 18. The opposite ends of the links 19 are pivotally connected to bolts 20 which are carried by an annular flange 21 comprising the inner portion of the remainder of the clutch disc indicated at 22 in Figs. 1 and 3. Friction facings 24 are carried adjacent each surface of the disc 22 and are secured to said disc by means of countersunk rivets 25. A pressure plate 26, comprising an annular ring, is adapted to be disposed adjacent the outer friction facing 24, said pressure plate being positioned in a plane substantially parallel to the face of the friction element. Recesses 27 are provided at circumferentially spaced intervals in the pressure plate 26, each recess 27 comprising a bore 28 of relatively enlarged diameter and a bore 29 of relatively restricted diameter. Elongated bolts 30 are positioned in the recesses 27 and extend outwardly therefrom, said bolts being provided with heads 31 which are retained within the portion of the recesses 27 of enlarged cross section.

A collar 32 embraces shaft 10 and is spaced therefrom, said collar terminating at one end in an outwardly extending annular flange 33 which carries ring 34. A sleeve 35 is slidably but non-rotatably positioned upon collar 32, said sleeve being slidably secured to said collar by means of key 36 which is adapted to move through a slot provided in the sleeve 35. A disc or head 37 is carried by the sleeve 35 and is provided with a plurality of apertures 38 through which bolts 30 extend. A plurality of lugs 39 are mounted upon the outer face of the head 37 and carry bolts or pins 40 which serve as fulcrums for levers 41. The toe 42 of each lever 41 is adapted to contact nut 43 threadedly secured to the end of bolt 30, the toe 42 being of bifurcated construction. The opposite ends of levers 41 extend radially toward shaft 10 and bear upon the flange 33 of collar 32. A compression coil spring 44, hereinafter referred to as the clutch spring, circumscribes each bolt 30 and is confined between the head 37 and the pressure plate 26.

A plurality of lugs 45 are secured to the web of the fly-wheel 5, said lugs carrying bolts or pins 46 to which links 47 are pivotally secured. The opposite ends of links 47 are pivotally mounted upon bolts 48 which are threaded into bosses 49 formed upon the pressure plate 26. The lugs 45 are spaced circumferentially around fly-wheel 3 and a boss 49 is provided on the pressure plate 26 adjacent each lug.

In operation, fly-wheel 3 is driven by the vehicle engine. One end of clutch shaft 10 extends into the transmission of the vehicle and the opposite end thereof is journalled in the bore 8 of the fly-wheel. When operative connection is desired between the engine and the transmission of the vehicle, springs 44 acting between head 37 and pressure plate 26 move the pressure plate into contact with the outer clutch facing 24 and urge the inner clutch facing into contact with the web 4 of the fly-wheel. When the apparatus is in this position the load is delivered from the fly-wheel to the clutch disc and is transmitted through links 19 to the inner portion of the clutch disc, through hub 13 to shaft 10. When it is desired to disengage the clutch, the clutch pedal (not shown) is pushed downwardly by the driver and means connected to said clutch pedal is provided for contacting ring 34 whereby collar 32 is moved inwardly. When collar 32 moves inwardly the inner ends of levers 41 are also moved inwardly and as a consequence, the outer ends 42 thereof move outwardly pulling pressure plate 26 away from the fly-wheel against the compression of springs 44. When the normal pressure is relieved from the friction facings 24, said facings are permitted to move away from the fly-wheel by the provision of the pivoted links 19, and hence, complete disengagement of the clutch shaft is secured. Hub 13 may be immovably mounted upon the end of shaft 10 or, if desired, the hub may be slidable on said shaft. However, by the provision of the links 19 it is immaterial whether hub 13 moves or not since the outer portion of the clutch disc will move independently of the inner portion thereof. In this manner binding of the splines 11 with splines 12 has no bearing upon the disengagement of the friction material from the fly-wheel since said disengagement is only dependent upon movement of the links 19.

In view of the fact that when the outer portion 22 of the clutch disc moves relative to the inner portion 15 of said disc, there is a slight degree of rotation of said portions with respect to each other, the apertures in links 19 through which bolts 18 pass are slightly larger than the diameter of said bolts and the inner faces 50 of the bolt heads and the faces of washers 51 between which the links are confined are rounded to permit a slight degree of lateral motion of the links.

As can readily be seen, head 37 moves in unison with fly-wheel 3 as does also pressure plate 26. This movement is brought about by the connecting links 47 which permit motion of the pressure plate 26 in a direction parallel to the axis of the shaft 10 but render the pressure plate immovable with respect to the fly-wheel in regard to rotary motion. Heretofore the connection between the fly-wheel and pressure plate of the usual clutch mechanism was accomplished through the medium of keying the pressure plate to slots or key ways provided in lugs or a casing carried by the fly-wheel. These keys, frequently become bound in the key ways and, hence, prevented movement of the pressure plate to release the friction facings from contact with the fly-wheel rendering clutch pedal operation difficult.

In the present invention by the provision of linkages 47 binding is substantially eliminated, which is conducive to more satisfactory clutch operation. In view of the fact that movement of the pressure plate 26 along a line parallel to the axis of shaft 10 produces a slight degree of rotation of the pressure plate, the same provision is made with respect to links 47 as has been hereinbefore described with regard to links 19, that is, a slight degree of lateral movement is provided at the connection of the links with the bolts 48.

Figure 4:
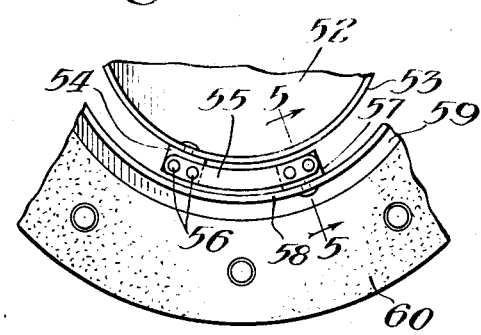
Fig. 4 is a fragmentary face view of a modified form of coupling or connecting device.
Figure 5:
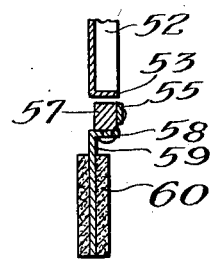
Fig. 5 is a sectional view taken on line 5—5 of Fig. 4.

Referring particularly to Figs. 4 and 5 in which a slight modification of my invention is shown. The reference numeral 52 indicates the inner portion of a clutch disc similar to the member 15, said inner portion being secured to a suitable hub (not shown) which, in turn, is mounted upon the clutch shaft. The inner portion of the disc is provided with an annular flange 53. A plurality of blocks 54 are secured in circumferentially spaced relationship upon the flange 53, said blocks being riveted to said flange or attached in any other suitable manner. A leaf or blade spring 55 is secured at one end to each of said blocks, the means of securement comprising rivets 56 or the like. The opposite ends of each of said springs are secured to blocks 57 which, in turn, are mounted upon annular flange 58 comprising a portion of the disc 59. Similar to the construction illustrated in Figs. 1, 2 and 3, any desired number of springs 55 may be used whereas in the construction illustrated in Figs. 1, 2 and 3 any desired number of links 19 or 47 may be employed. A clutch facing 60 is secured to each face of the disc 59, the clutch disc as a whole comprising the inner portion 52 and the outer portion 59, and is adapted to be employed with a clutch mechanism similar to that hereinbefore described.

A similar spring coupling or connection (not shown) may be utilized to associate the fly-wheel with the pressure plate, that is, leaf or blade springs mounted in a manner similar to the mounting of springs 55 may supplant the links 47.

The arrangement is such that when the clutch is in engaged position the pressure plate bearing against the friction facing 60 confines said facing in contact with the fly-wheel. When it is desired to disengage the clutch the spring pressure acting upon the pressure plate is relieved and the outer disc 59 acting under the influence of springs 55 moves the friction facings 60 away from the fly-wheel. The same operation, of course, takes place with respect to the pressure plate, that is, said pressure plate moves away from the friction facings when the influence of the clutch springs is removed, the movement of the pressure plate taking place through the agency or urging force of the springs connecting the pressure plate to the fly-wheel.

Referring particularly to Fig. 6 another modified form of my invention is shown wherein 61 indicates a conventional fly-wheel. Secured to said fly-wheel and extending rearwardly therefrom is a clutch housing similar to that shown in Fig. 7, to be hereinafter more fully described. The reference numeral 62 indicates a portion of said housing, namely, that portion which extends at right angles to the web of the fly-wheel.

The inner surface of the housing 62 is provided with lugs 63 which are spaced circumferentially from each other at desired points, said lugs being in the form of splines which are disposed substantially at right angles to the fly-wheel web. A ring 64 is adapted to be positioned within the housing 62, said ring being provided with slots 65 which register with the lugs or splines 63. As can readily be seen the housing 62 moves in unison with the fly-wheel when the fly-wheel is rotating, and similarly the ring 64 moves in unison with the housing by virtue of the engagement of the splines or lugs 63 in the slots 65. Radially projecting lugs 66 are formed upon the inner periphery of the ring 64 at circumferentially spaced intervals. A leaf or blade spring 67 is secured to each of the lugs 66 by means of rivets or the like 68. The opposite end of each of said springs 67 is secured to radially projecting lugs 69 carried by the outer portion of a pressure plate 70. Disposed between the pressure plate 70 and the web of the fly-wheel 61 is an outer clutch disc 71 which carries friction facings (not shown).

The inner periphery of the disc 71 carries inwardly extending radial lugs 71' which are positioned in circumferentially spaced relationship. A leaf or blade spring 72 is mounted as shown at 73 in Fig. 6 upon each of said lugs 71'. The opposite end of each of said springs is secured to a lug 74 formed upon the outer surface of the inner disc 75. The inner disc 75 is in turn secured by means of rivets or the like 76 to hub 77 which is provided with splines 78 engageable with splines 79 formed on a clutch shaft 80. In this form of my invention means is provided comprising ring 64 for readily positioning my improved pressure plate within the clutch housing. The operation of this clutch is similar to that hereinbefore described and the hub 77 may or may not be immovably mounted upon the clutch shaft 80. When disengagement of the clutch takes place, pressure plate 70, relieved of the influence of the clutch springs moves outwardly away from the fly-wheel. This movement is accomplished through the agency of the blade springs 67. When the friction facings are thus relieved of the pressure of the pressure plate, the outer disc 71 moves outwardly away from the web of the fly-wheel under the influence of springs 72. In this manner disengagement is not dependent upon movement of the hub 77 upon shaft 80 and, consequently, the possibility of binding when the device is delivering high torque is eliminated.

Referring particularly to Figs. 7, 8 and 9, a further modification of my invention is shown. The reference numeral 81 indicates a portion of a clutch mechanism comprising the rear end of engine shaft 82 and fly-wheel 83 mounted thereon. A clutch shaft 84 is journalled at one end in a recess 85 provided in the end of the engine shaft 82. A clutch housing 86 is secured to the fly wheel 83 by means of bolts or the like 87. Collar 88 embraces a portion of the clutch shaft 84 and is slidably associated with sleeve 89 comprising a portion of the housing 86. The collar 88 is identical with collar 32 illustrated in Fig. 1 and the housing 86 corresponds functionally to the head plate 37 shown in Fig. 1, and housing 62, a portion of which is illustrated in Fig. 6. A hub 90 having internal splines is mounted upon the splined portion 91 of clutch shaft 84, said hub having a plurality of radially protecting bosses 92.

A self-aligning ball bearing assembly 93 is positioned in a suitable bore provided in each of the bosses 92, the inner race of each of said ball bearing assemblies being secured to a member 94. The member 94 in each of the assemblies is cylindrical and rotates freely within the bosses and a threaded bolt or screw 95 is eccentrically carried by each of the members 94 and projects outwardly therefrom. The outer end of each of said bolts 95 is provided with a head 96. Bolts 95 are adapted to be positioned through a flange 97 formed at the inner periphery of a clutch disc 98 and spacers 99 embrace the shank of the bolts 95 whereby the flange 97 is confined between the heads 96 of the bolts and the spacers. By the provision of the self-aligning bearing assemblies 93 the slightly arcuate movements of the members 94, with respect to the axis of shaft 84, is permitted. Adjacent the outer periphery of the clutch disc 98 annular friction facings 100 are mounted by means of conventional rivets 101.

That portion of clutch housing 86 which projects at right angles to the web of the fly-wheel 83 is provided with a plurality of apertures 102, in each of which a self-aligning ball bearing assembly 103 is positioned. A small cover plate 104 is adapted to form a closure for the outer portion of the apertures 102 and prevent grit and dirt from entering the ball bearing. A cylindrical element 105 is associated with the inner race of each of the ball bearing assemblies 103, each of said cylindrical elements being provided with inwardly projecting pins 106, the ends 107 of which are of restricted diameter and are loosely disposed in apertures formed in the outer peripheral surface of the pressure plate 108. The pins 106 are eccentrically positioned with respect to the cylindrical elements 105. A plurality of coil springs 109 are confined between pressure plate 108 and the inner face of casing or housing 86, said springs corresponding to the springs 44 illustrated in Fig. 1.

In this form of my invention the hub 90 may or may not, as desired, be rigidly mounted upon the end of the clutch shaft 84. When the clutch is in engaged position the pressure plate 108 bears against the friction facings 100 and confines said facings in contact with the web of the fly-wheel 83, pressure plate 108 being urged in this position by springs 109. Movement of the clutch disc 98 toward the fly-wheel is permitted by the eccentric relationship of the bolts 95 and the elements 94 which latter move with the inner race of the ball bearing assembly 93. When the clutch is released, that is, when springs 109 cease to bear upon the pressure plate 108, clutch disc 98 no longer has any urging force tending to keep it in contact with the fly-wheel 83 and, hence, the inner races of the ball bearing assemblies permit free movement of the elements 94 and, hence, pins or bolts 95. In this manner the normal pressure of the clutch facing is relieved. Motion of the fly-wheel 83 is transmitted directly to the housing 86 since said housing is rigidly mounted thereon and, inasmuch as housing 86 is secured to pressure plate 108 by means of pins 106, said pressure plates rotate in unison with the fly-wheel. In view of the fact that the pressure plate 108 must also be movable at right angles to its plane of rotation, this motion is accommodated by rotation of the members 105 within the ball bearing assemblies 103 and the eccentric movement of pins 106. It can readily be seen that in this manner no binding of the pressure plate with the housing is permitted as has heretofore been the case wherein the pressure plate has been splined or keyed to the housing. In this form of my invention both the pressure plate and the clutch disc move into and out of engagement with a minimum of friction and, hence, the possibility of failure of the clutch to disengage is extremely remote.

It will be noted that when the clutch disc 98 moves relative to the hub 90, or the pressure plate 108 moves relative to the housing 86, several movements must be taken into consideration. There is the translatory movement parallel to the axis of shaft 84, and circumferential movement about the axis of shaft 84. The translatory movement is readily accommodated by the rotary movements of the pins 95 and 107 in unison with the inner races 94 and 105 respectively. However, these movements must be accompanied by rotary movement of the clutch disc with respect to the hub and the pressure plate with respect to the housing 86. These movements, of course, are rotary or circumferential whereas the planes of the bearings are tangential to arcs described about the axis of rotation, that is, the axis of shaft 84. However, all of the ball bearing assemblies are self-aligning, that is, the planes of the inner races can be changed, within a small degree, with respect to the planes of the outer races. This permits the eccentric pins to describe small arcs instead of moving precisely in a tangential plane. If bearings other than the self-aligning type are used these movements can be compensated for by permitting pins 95 and pins 107 to rock in flange 97 and pressure plate 108 respectively by making said connections sufficiently loose. However, self-aligning bearings are preferable since full advantage of the frictionless characteristics of the bearings may be obtained.

I claim as my invention:

1. In combination with a clutch mechanism which comprises a driving member, a pressure plate, a driven shaft and means for moving the pressure plate into and out of operative position, of a clutch disc comprising an inner and an outer section, a friction facing on said outer section positioned between the driving member and the pressure plate, the inner section being carried by said driven shaft, and swingable means connecting said inner and outer sections together whereby said outer section is freely movable independently of said inner section in a direction parallel to said driven shaft.

2. In combination with a clutch mechanism having a fly-wheel, a pressure plate, a driven shaft and means for moving said pressure plate parallel to said driven shaft, of a clutch disc comprising an inner and an outer section, a friction facing carried on said outer section positioned between the fly-wheel and the pressure plate, the inner member being carried by said driven shaft, and swingable means connected to said inner and outer sections whereby said outer section is freely movable independently of said inner section a predetermined distance in a direction parallel to said driven shaft.

3. In combination with a clutch mechanism having a fly-wheel, a pressure plate, a driven shaft and means for moving said pressure plate parallel to said driven shaft, of a clutch disc comprising an inner and an outer section, a friction facing carried on said outer section positioned between the fly-wheel and the pressure plate, the inner member being carried by said driven shaft, and means for connecting said inner and outer sections together whereby said outer section is movable independently of said inner section a predetermined distance in a direction parallel to said driven shaft, said means comprising a plurality of swingably movable members secured to the inner periphery of the outer disc section and connected to the outer periphery of the inner section.

4. In combination with a clutch mechanism having a fly-wheel, a pressure plate, a driven shaft and means for moving said pressure plate parallel to said driven shaft, of a clutch disc comprising an inner and an outer section, a friction facing carried on said outer section positioned between the fly-wheel and the pressure plate, the inner section being carried by said driven shaft, and means for connecting said inner and outer sections together whereby said outer section is movable independently of said inner section a predetermined distance in a direction parallel to said driven shaft, said means comprising a plurality of flexible members secured to the inner periphery of the outer disc section and connected to the outer periphery of the inner section, and tending to normally hold said inner and outer sections in offset relationship.

5. In combination with a clutch mechanism having a fly-wheel, a pressure plate, a driven shaft and means for moving said pressure plate parallel to said driven shaft, of a clutch disc comprising an inner and an outer section, a friction facing carried on said outer section positioned between the fly-wheel and the pressure plate, the inner section being carried by said driven shaft, and means for connecting said inner and outer sections together whereby said outer section is movable independently of said inner section a predetermined distance in a direction parallel to said driven shaft, said means comprising a plurality of links pivotally secured to the inner periphery of the outer disc section and connected to the outer periphery of the inner section.

6. In combination with a clutch mechanism having a fly-wheel, a pressure plate, a driven shaft and means for moving said pressure plate parallel to said driven shaft, of a clutch disc comprising an inner and an outer section, a friction facing carried on said outer section positioned between the fly-wheel and the pressure plate, the inner section being carried by said driven shaft, and means for connecting said inner and outer sections together whereby said outer section is movable independently of said inner section a predetermined distance in a direction parallel to said driven shaft, said means comprising a plurality of ball bearing assemblies carried by the inner section, eccentrically disposed pins carried by said bearings, said pins being connected to the inner periphery of said outer disc section.

7. In combination with a clutch mechanism having a fly-wheel and a coaxially disposed clutch shaft, of a clutch disc comprising an inner and an outer section, a friction facing carried on said outer section, a pressure plate connected to said fly-wheel for rotation in unison therewith, said connection comprising a plurality of links pivotally connected to said pressure plate and fly-wheel whereby limited lateral movement of said pressure plate with respect to said fly-wheel is permitted, the outer section of said clutch disc being disposed between said pressure plate and the fly-wheel, the inner section of said clutch disc being connected to said clutch shaft, and a plurality of links pivotally connecting said inner and outer sections together whereby said outer section is movable independently of said inner section a predetermined distance in a direction parallel to said clutch shaft.

8. In combination with a clutch mechanism having a fly-wheel and a coaxially disposed clutch shaft, of a clutch disc comprising an inner and an outer section, a friction facing carried on said outer section, a pressure plate connected to said fly-wheel for rotation in unison therewith, said connection comprising a plurality of eccentric bearing members which permit limited lateral movement of said pressure plate with respect to said fly-wheel, the outer section of said clutch disc being disposed between said pressure plate and the fly-wheel, the inner section of said clutch disc being connected to said clutch shaft, and eccentric bearing means for connecting said inner and outer sections together whereby said outer section is movable independently of said inner section a predetermined distance in a direction parallel to said clutch shaft.

9. In combination with a clutch mechanism having a fly-wheel and a coaxially disposed clutch shaft, of a clutch disc comprising an inner and an outer section, a friction facing carried on said outer section, a pressure plate connected to said fly-wheel for rotation in unison therewith, said connection comprising a plurality of ball bearings associated with said fly-wheel, pins eccentrically carried by the inner races of said ball bearings, said pressure plate being provided with apertures for the reception of said pins whereby limited lateral movement of said pressure plate with respect to said fly-wheel is permitted, the outer section of said clutch disc being disposed between said pressure plate and the fly-wheel, the inner section of said clutch disc being connected to said clutch shaft, and means for connecting said inner and outer sections together whereby said outer section is movable independently of said inner section a predetermined distance in a direction parallel to said clutch shaft.

EARL A. WALES.